M. H. KEELER.
HOSE COUPLING.
APPLICATION FILED SEPT. 8, 1915.
1,200,118.
Patented Oct. 3, 1916.
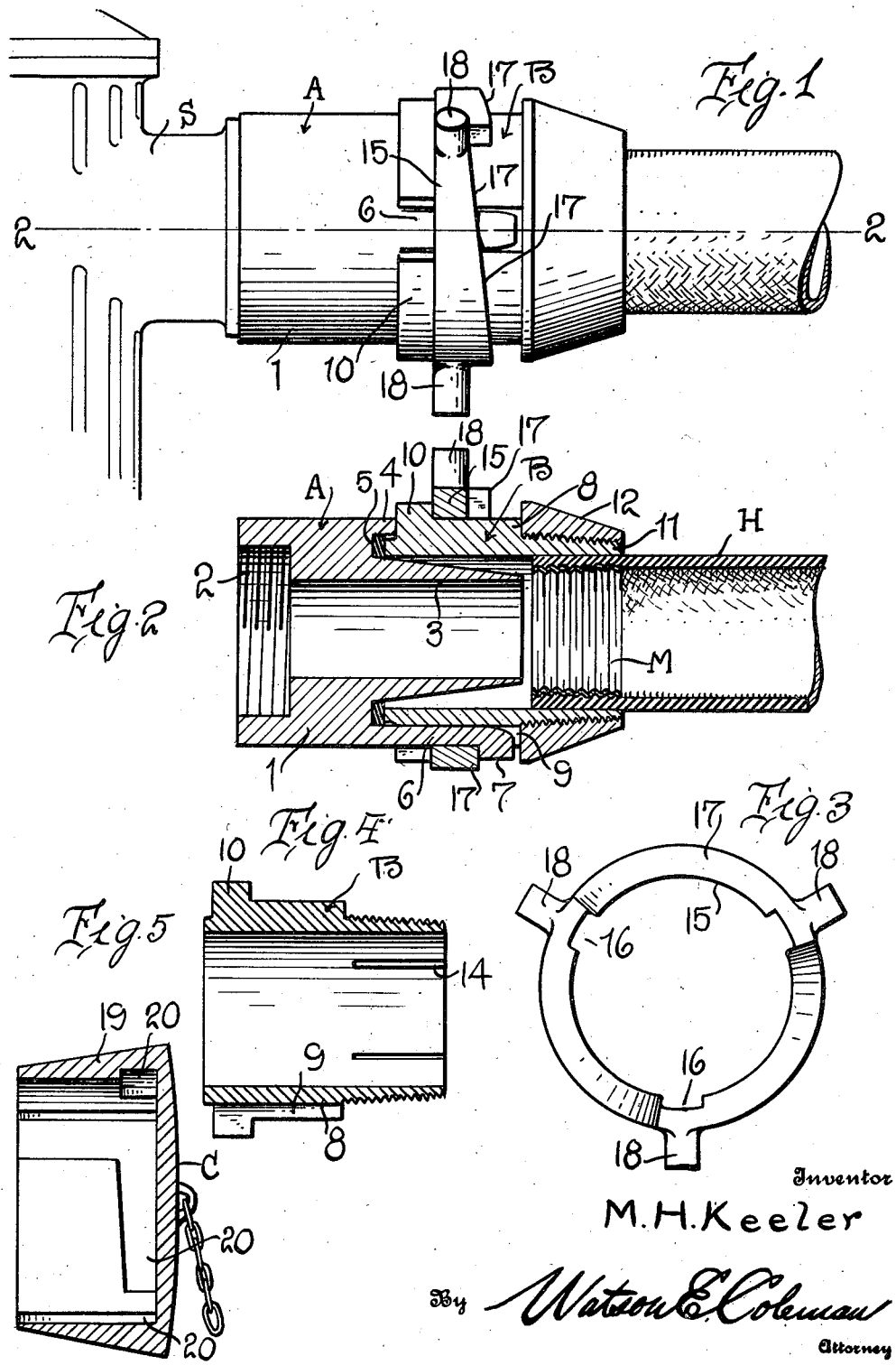
Inventor
M. H. Keeler
By Watson E. Coleman
Attorney

UNITED STATES PATENT OFFICE.

MORRIS H. KEELER, OF SABETHA, KANSAS.

HOSE-COUPLING.

1,200,118.

Specification of Letters Patent.

Patented Oct. 3, 1916.

Application filed September 8, 1915. Serial No. 49,496.

*To all whom it may concern:*

Be it known that I, MORRIS H. KEELER, a citizen of the United States, residing at Sabetha, in the county of Nemaha and State of Kansas, have invented certain new and useful Improvements in Hose-Couplings, of which the following is a specification, reference being had to the accompanying drawings.

This invention relates to certain improvements in hose couplings; and it is an object of the invention to provide a novel and improved coupling whereby a hose may be quickly and effectively engaged with a stand pipe, such as a fire plug or hydrant.

The invention consists in the details of construction and in the combination and arrangement of the several parts of my improved hose coupling whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view in elevation illustrating a pipe coupling arranged in accordance with an embodiment of my invention and in assembled relation; Fig. 2 is a sectional view taken through the coupling substantially on the line 2—2 of Fig. 1; Fig. 3 is a view in elevation of the locking ring as herein embodied; Fig. 4 is a sectional view through the female member of the coupling detached; and Fig. 5 is a sectional view taken through the cap adapted to be employed in connection with the male member of the coupling when the same is not in use.

As disclosed in the accompanying drawings, A denotes the male member of my improved coupling as herein disclosed and B the female member coacting therewith, and, as herein embodied, the male member comprises a tubular body 1 having the bore thereof enlarged at one end, as at 2, said enlarged portion being threaded in order to be readily engaged with a stand S, such as a fire plug or hydrant. The bore of the member A is defined at the end opposite to the enlarged portion 2 by the longitudinally disposed nipple 3, the periphery of which is tapered. The marginal portion of the casing 1 adjacent the base of the nipple 2 is provided with the annular flange 4 affording a seat for the gasket 5 and extending from said flange 4 are the equidistantly spaced arms 6 having their free extremities provided with the upwardly and laterally directed lugs 7. In practice, I find it preferable to have the arms 6 three in number and each of said arms of a length less than the length of the nipple 3.

The female member B, as herein disclosed, comprises a tubular casing 8 into the bore of which the nipple 3 is adapted to extend in assembling the coupling, the outer end of said casing engaging the gasket 5, hereinbefore referred to. The outer end portion of the casing 1 is provided with the equidistantly spaced longitudinally disposed slots 9 adapted to receive the arms 6 and the spaces between said slots 9 adjacent the forward end of the casing 8 are provided with the flanges 10.

The inner end of the casing 8 is reduced, as at 11, and has its periphery threaded to permit the engagement therewith of the collar 12 and, as herein disclosed, the reduced portion 11 of the casing 8 is slit, as indicated at 14, so that the hose H may be effectively engaged with the casing 8. As effectively embodied, the connected extremity of the hose H is provided with the interior metallic member M, which coacts with the reduced portion 11 of the casing to effectively secure the hose H to the female member B when the collar 12 is threaded upon the extension 11. The inner face of the collar 12 extends beyond the periphery of the casing 8 proper and between said collar 12 and the flanges 10 is rotatably supported the locking ring 15 provided in its inner wall with the recesses 16 adapted to register with the slots 9 so that the arms 6 may be properly engaged with the casing 8 without obstruction. The rear side face of the ring 15 between the recesses 16 are provided with the cam faces 17 which upon proper rotation being imparted to the ring 15 coact with the lugs 7 so as to assure an effective and tight engagement between the members A and B. In order to facilitate the requisite rotation of the ring 15, I provide the same with the radially disposed extensions 18. When the member B is disconnected from the member A, the cap C is employed adapted to be applied over the outer end of the member A and the flange 19 of the cap C has its inner wall provided with the bayonet slots 20 adapted to coact with the arms 6 and the lugs 7 whereby said cap may be readily applied to the member 1 and effectively maintained thereon.

From the foregoing description, it is thought to be obvious that a hose coupling constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

A coupling of the character described comprising a male member and a female member, the male member being provided with a longitudinally disposed nipple adapted to be disposed within the female member, arms extending from the male member in a direction substantially parallel to the axial center of the nipple and adapted to snugly fit the female member and terminating in outwardly and laterally directed lugs, the periphery of the female member being provided with slots to receive the arms, annular shoulders carried by the female member, a ring loosely mounted on the female member between the annular shoulders, the wall of the bore of the ring being provided with recesses adapted to register with the slots of the female member, the inner wall of the ring between the recesses thereof being formed into cam faces adapted to engage the lugs on the arms of the male member.

In testimony whereof I hereunto affix my signature in the presence of two witnesses.

MORRIS H. KEELER.

Witnesses:
F. C. WOODBURY,
E. E. MORRIS.